April 1, 1952     R. E. TRAFTON     2,591,638
LINE CARRIER
Filed March 8, 1949
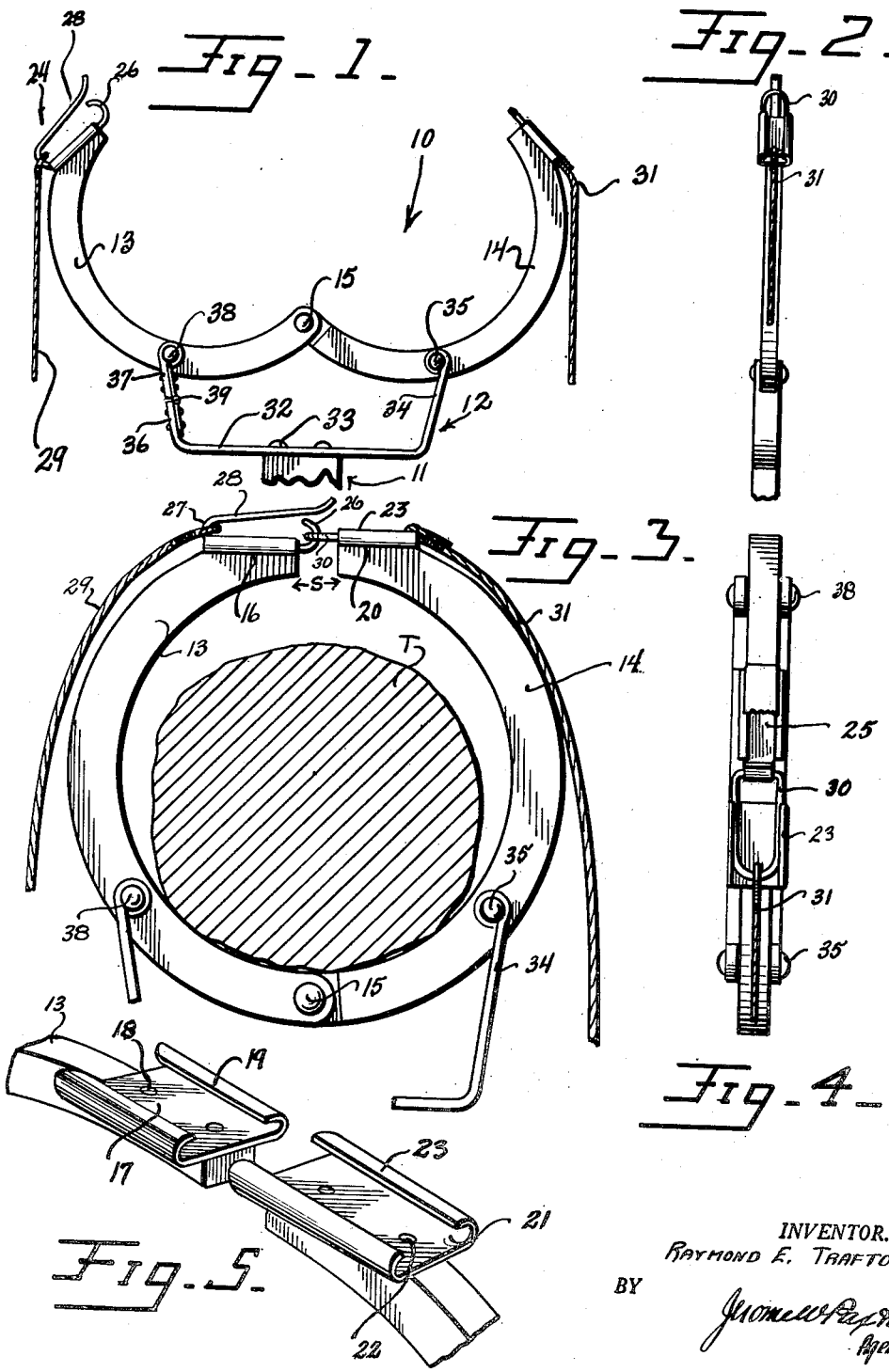
INVENTOR.
RAYMOND E. TRAFTON
BY

UNITED STATES PATENT OFFICE 2,591,638

LINE CARRIER

Raymond E. Trafton, Paton, Iowa

Application March 8, 1949, Serial No. 80,301

4 Claims. (Cl. 294—19)

The present invention relates to "a line carrier," and more particularly has reference to a device whereby a line or similar unit may be carried over a tree limb or other object which is located at a height which is not readily accessible from the ground or supporting surface.

It is, of course, well known that in trimming overhanging branches or limbs from trees or performing certain pruning operations, it is not convenient to reach the limbs by a ladder or other means and, in addition, even in situations where it is possible to perform the necessary operation from a ladder, the workman is in a rather precarious position and may fall from the ladder, with the possibility of serious injury. In addition to performing overhead trimming operations, numerous situations arise where it is desirable to be able to pass or carry a line over an overhead support, and by virtue of the present invention, I have provided a device which may be readily adapted to both uses.

Accordingly, an important object of the present invention is to provide a unit which is adapted to pass a line or the like over an overhead support such as a tree limb which may be readily manipulated from a point distantly removed from the limb and which, after passing the line over the limb, may be readily detached from the line, thus leaving the line in position on the limb.

Yet another object of my invention is to provide a device of the character described which includes a pair of pivotally connected jaws, each of the jaws having associated therewith means for supporting one end of a flexible line, the arrangement being such that when the jaws engage the limbs, the lines are connected together so that when the device is removed from the limbs, the lines will form a loop about the limbs.

And another object of my invention is to provide a line carrier of the character hereinabove described which includes relatively few essential working parts, positive and efficient in operation and capable of being quickly and inexpensively manufactured.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which:

Figure 1 is an elevational view of the line carrier, the jaws of which are shown in their open position, each jaw having positioned thereon a clip carrying one end of a line.

Figure 2 is an end view of the carrier shown in Figure 1.

Figure 3 is an elevational view, partly broken away, showing the position of the jaws when the unit has been moved to its operative position with relation to a tree limb.

Figure 4 is a top plan view of the carrier shown in Figure 3.

Figure 5 is a view in perspective showing the clip member carried by the upper end of each of the pivoted jaws.

Viewing the invention broadly, it comprises a limb or object embracing section 10, a handle 11, and a bracket 12, by which the limb embracing section is mounted to the handle. Of course the size of the limb embracing section 10 and the handle 11 depends entirely upon the particular problems encountered, and it is thought that one skilled in the field can readily determine the desired size of the respective members.

More specifically, the limb embracing section 10 comprises complementary arcuate jaws 13 and 14 which are hinged together adjacent their lower ends, as shown at 15. When the jaws are in their closed or operative position, it will be noted that the upper ends thereof are not in abutting relationship, but are separated by a gap or space S. The upper end of the jaw 13 is formed with a flat face 16 to which a retaining member 17 is secured by rivets or the like 18, and it will be noted that each longitudinal edge of the retaining member is inturned, as at 19, to provide a channel along each longitudinal edge thereof, and the purpose of this member will hereinafter be more fully described.

The corresponding end of the jaw 14 is formed with a similar flat face 20, but it will be noted that the face 20 is at a point above the face 16 on the jaw 13. A retaining member 21 is riveted to the jaw 14, as shown at 22, and also has its longitudinal ends inturned, as shown at 23, and the channels formed by the inturned edges 20 and 23 are in alinement when the unit is in its operative or closed position, as shown in Figure 3.

A resilient line supporting clasp 24 comprises a base member 25 which is provided with a hook 26 at one end, while the opposite end is upturned, as shown at 27, and terminates in a portion 28 substantially in parallel relation to the base 25. The base 25 is of such width that the longitudinal edges thereof will extend into the channels formed by the inturned edges 19 of the retaining member and be frictionally held by the retaining member. A rope or other line 29 has one of its free ends secured to the upturned portion 27 of the clasp 24 in any convenient manner.

The retaining member 21 on the jaw 14 is adapted to receive an elongated loop-like element 30 and, as clearly shown in Figure 4, the sides of the loop 30 fit in the channels provided by the inturned edges 23 and will be retained therein. The free extremity of a rope 31 is attached to one end of the loop 30 in any desirable manner. It might be stated that when the clasp 24 and the loop 30 are mounted in their respective retaining members 17 and 21, the hook 26 projects a short distance beyond the inner end of the retaining member 17, and the inner end of the loop 30 extends beyond the inner end of its retaining member 21. It will further be noted that the lower wall of the retaining member 21 is in substantially horizontal alinement with the upper surface of the inturned edges 19 of the retaining member 17.

The supporting bracket 12 includes a horizontal strap 32 which is conveniently attached to the handle 11, as indicated at 33. One end of the strap 32 is formed with an integral angular extension 34, the upper or free end of which is pivoted to the jaw 14, as indicated at 35. The opposite end of the strap is also formed with an angular extension 36 and a support 37 which is pivoted to the jaw 13, as shown at 38, is hingedly connected to the extension 36 by a leaf hinge assembly 39, and hence, it can be seen that the jaws 13 and 14 are well supported by the handle 11.

In operation, and assuming that it is desired to pass a line over a tree limb designated T, the jaws 13 and 14 are moved to the position shown in Figure 1 and the rope 29 is attached to the clasp 24 while the rope section 31 is attached to the clip 30 and the clasp and loop are then mounted in the retaining members 17 and 21. The operator then moves the device upwardly by the handle 11 so that the jaws will embrace the limb T and when the limb contacts the jaws at the pivot point 15, the jaws will be moved into the closed or operative position, at which time the inner end of the loop 30 will pass over the hook 26 of the clasp 24 whereby the clasp and hook will be connected. As the device is moved downwardly, the jaws 13 and 14 will be moved apart, the clasp 24 and the loop 30 will be removed from their retaining members 17 and 21, thus leaving the ropes 29 and 31 around the limb T, providing, in effect, a continuous line over the tree limb.

Hence, it can be seen that I have provided a very simple construction which will effectively pass the line over the overhead object and which is not too heavy for easy and efficient operation. I have determined that where it is desired to pass a heavy rope or cable over the limb, this can be easily accomplished by attaching one end of such rope to either one of the free ends of the ropes 29 or 31 and by pulling the opposite smaller rope the heavy rope may be easily and quickly moved over the limb.

In situations where it is desired to saw tree limbs, a flexible self-clearing saw of conventional type (not shown) may have one end suitably anchored to the loop 30, with the opposite end attached to a rope section. When the device has been manipulated to connect the clasp 24 and the loop 30 and the limb embracing section 10 removed from the limb, the saw may be pulled over the limb by using a seesaw movement for removing the limb from the tree.

The invention is not to be confined to any strict conformity with the showing in the drawing, but may be changed or modified so long as such changes or modifications mark no material departure from the salient features of the invention as expressed in the appended claims.

I claim:

1. A device for carrying a flexible line over a tree limb or the like comprising opposed jaws pivotally connected adjacent the lower ends thereof, a handle, a flexible bracket secured to the handle, a pivotal connection between each jaw and said flexible bracket, a retaining member carried by the upper end of one of said jaws, a clasp frictionally supported by said retaining member to which a flexible line is attached, a second retaining member carried by the upper end of the other of said jaws, and a loop element frictionally supported by said last named retaining member to which a flexible line is attached, the arrangement being such that when the jaws are moved to embrace the limb and the pivotal connection between said jaws is forced against the limb, the jaws move toward each other whereby the loop element engages the clasp, and when the jaws are moved away from the limb, the clasp and loop element are detached from the said jaws, thus leaving the lines looped over the limb.

2. A device as claimed in claim 1 wherein each retaining member comprises a base secured to the end of the jaw and having the longitudinal edges inturned to form a channel along each longitudinal edge.

3. A device as claimed in claim 2 wherein the clasp and loop element are adapted to be frictionally retained in the channels formed by the inturned longitudinal edges.

4. A device for carrying a flexible line over a tree limb or the like comprising opposed jaws pivotally connected adjacent the lower ends thereof, a handle, a flexible bracket secured to the handle, a pivotal connection between each jaw and the flexible bracket, a base secured to the upper end of each of said jaws, each longitudinal edge of said base being inturned to provide a channel along each longitudinal edge thereof, a substantially U-shaped clasp to which a flexible line is attached adapted to be disposed upon one of said bases with each longitudinal edge thereof extending into the channel along each longitudinal edge of said base, a hook on the inner end of said clasp, and an elongated loop to which a second flexible line is attached adapted to have the sides thereof disposed in the channels along each longitudinal edge of the other of said bases, the arrangement being such that when the jaws are moved to embrace the limb and the pivotal connected between said jaws is forced against the limb, thus moving the jaws towards each other so that the said loop will engage the hook, whereby each of the said flexible lines are interlocked and upon removal of the clasp and loop from the channels, said clasp and loop will be disconnected from said bases, thereby leaving the lines over the limb.

RAYMOND E. TRAFTON.

REFERENCES CITED

The following references are of record in the file of this patent:

FOREIGN PATENTS

| Number | Country | Date |
| --- | --- | --- |
| 25,177 | Great Britain | July 2, 1914 |